United States Patent
Ishikura et al.

(10) Patent No.: US 11,424,681 B2
(45) Date of Patent: Aug. 23, 2022

(54) MULTIPHASE SWITCHING POWER SUPPLY DEVICE

(71) Applicants: GS YUASA INFRASTRUCTURE SYSTEMS CO., LTD., Kawagoe (JP); HONDA MOTOR CO., LTD., Tokyo (JP)

(72) Inventors: Keita Ishikura, Saitama (JP); Takumi Shiiyama, Saitama (JP); Masanori Ueno, Saitama (JP)

(73) Assignees: GS YUASA INFRASTRUCTURE SYSTEMS CO., LTD., Kawagoe (JP); HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/044,261

(22) PCT Filed: Apr. 27, 2018

(86) PCT No.: PCT/JP2018/017110
§ 371 (c)(1),
(2) Date: Sep. 30, 2020

(87) PCT Pub. No.: WO2019/207747
PCT Pub. Date: Oct. 31, 2019

(65) Prior Publication Data
US 2021/0028705 A1 Jan. 28, 2021

(51) Int. Cl.
*H02M 3/158* (2006.01)
*H02M 7/493* (2007.01)
(Continued)

(52) U.S. Cl.
CPC .......... *H02M 3/1584* (2013.01); *H02M 1/32* (2013.01); *H02M 7/493* (2013.01); *H02M 1/0009* (2021.05); *H02M 3/1586* (2021.05)

(58) Field of Classification Search
CPC .... H02M 1/32; H02M 3/1584; H02M 3/1586; H02M 1/0043
See application file for complete search history.

(56) References Cited

U.S. PATENT DOCUMENTS 8,710,810 B1* 4/2014 McJimsey ............. H02M 3/158
323/283
2003/0155898 A1* 8/2003 Olsen ................. H02M 3/1584
323/283

(Continued)

FOREIGN PATENT DOCUMENTS

| JP | H09-215322 A | 8/1997 |
| JP | 2008-099455 A | 4/2008 |
| JP | 2012-050207 A | 3/2012 |

*Primary Examiner* — Alex Torres-Rivera
(74) *Attorney, Agent, or Firm* — Hawaii Patent Services; Nathaniel K. Fedde (57) ABSTRACT

Provided is a switching power supply device capable of easily realizing multi-phase operation and current balancing with the number of operation phases depending on the amount of load. The switching power supply device includes: a main circuit; a control circuit (2) configured to output a reference pulse signal; an entire current detection circuit $CT_0$ configured to detect an output current of the entire main circuit as an entire current; a plurality of individual current detection circuits $CT_n$ provided corresponding to a plurality of power conversion units and configured to detect output currents of respective ones of the plurality of power conversion units as respective individual currents; and a pulse corrector (3) configured to generate individual pulse signals for respective ones of the plurality of power conversion units on the basis of the entire current, the individual currents and the reference pulse signal, and to output, to the plurality of power conversion units, respective ones of the individual pulse signals for the plurality of power conversion units as drive signals for respective switching (Continued)

elements, wherein the pulse corrector (3) determines the number of operation phases N' for the power conversion units on the basis of the entire current and, to the same number of power conversion units as the determined number of operation phases N', outputs respective ones of the individual pulse signals.

5 Claims, 4 Drawing Sheets

(51) Int. Cl.
*H02M 1/32* (2007.01)
*H02M 1/00* (2006.01)

(56) References Cited

U.S. PATENT DOCUMENTS

| | | | |
|---|---|---|---|
| 2007/0296387 A1* | 12/2007 | Dong | H02M 3/157 |
| | | | 323/285 |
| 2009/0190375 A1 | 7/2009 | Manabe et al. | |
| 2011/0051479 A1* | 3/2011 | Breen | H02M 3/1584 |
| | | | 363/148 |
| 2011/0204864 A1* | 8/2011 | Sreenivas | H02M 3/1584 |
| | | | 323/283 |
| 2013/0057239 A1 | 3/2013 | Kalje et al. | |
| 2013/0293207 A1* | 11/2013 | Wei | H02M 3/1584 |
| | | | 323/272 |

\* cited by examiner

MULTIPHASE SWITCHING POWER SUPPLY DEVICE

TECHNICAL FIELD

The present invention relates to a switching power supply device that converts an input voltage into an output voltage by using a plurality of converter units connected in parallel with each other.

BACKGROUND

In recent years, in association with the increase in output load, there has been known a multi-phase switching power supply device in which the number of operation phases is set to be two or more and the operation phases are driven in respective different phases shifted from each other, in order to realize large-current and low-ripple operation. Such a switching power supply device needs to be operated such that a current supplied to a load is equally shared by the operation phases. In this respect, there has been proposed a technology that detects a current deviation for each of the operation phases and adds a compensation signal for reducing the deviation to zero to a duty command value, thereby operating the device with a current being equally shared by the operation phases, without causing increase in size or complexity of the device (for example, Patent Document 1).

CITATION LIST

Patent Literature

Patent Document 1: Japanese Laid-Open Patent Application No. 09-215322

SUMMARY OF INVENTION

Technical Problem

However, the prior-art technology requires change of the control circuit itself because it performs multi-phase operation on the basis of values obtained by adding current compensation values to duty command values, and it accordingly has a problem in that its application to a switching power supply device employing a microcomputer or a dedicated analog control IC is difficult. For example, in the case of employing a microcomputer, calculation of the current compensation for each phase needs to be performed within the microcomputer, which requires an existing control program to be changed to a large extent. Further, while a plurality of PWM counters need to be used in the microcomputer for performing the multi-phase operation, there is limitation on the number of counters. Accordingly, to increase the number of phases, a high-performance microcomputer is required, which results in increase in cost. In the case of employing a dedicated analog control IC, there is a problem in that the application circuit usually is almost fixed, and it accordingly is difficult to incorporate a current correction circuit for calculating current compensation for each phase and a phase conversion circuit.

An objective of the present invention is to solve the above-mentioned problem of the prior-art technology, and accordingly to provide a switching power supply device that can easily realize multi-phase operation and current balancing with the number of operation phases depending on the amount of load, without changing the basic portion of the control circuit.

Solution to Problem

A switching power supply device of the present invention includes: a main circuit including a plurality of power conversion units each having a switching element and connected in parallel with each other; a control circuit configured to output a reference pulse signal on the basis of an output of the entire main circuit; an entire current detection circuit configured to detect an output current of the entire main circuit as an entire current; a plurality of individual current detection circuits provided corresponding to the plurality of power conversion units and configured to detect output currents of respective ones of the plurality of power conversion units as individual currents; and a pulse corrector configured to generate individual pulse signals for respective ones of the plurality of power conversion units on the basis of the entire current, the individual currents and the reference pulse signal, and to output, to the plurality of power conversion units, respective ones of the individual pulse signals for the plurality of power conversion units as drive signals for the respective switching elements, wherein the pulse corrector determines the number of operation phases for the power conversion units depending on the entire current and, to the same number of power conversion units as the determined number of operation phases, it outputs respective ones of the individual pulse signals.

Advantageous Effects of Invention

According to the present invention, since current correction and multi-phase operation are enabled by the use of the pulse corrector on the basis of a gate pulse signal output from the control circuit, the control circuit is not required to have a function of multi-phase (interleave) operation, and by simply adding the pulse corrector, the switching power supply device can easily be provided with the interleave (multi-phase) function, and there accordingly is achieved an effect of making it possible to easily realize multi-phase operation and current balancing with the number of operation phases depending on the amount of load.

DESCRIPTION OF EMBODIMENTS

Hereinafter, with reference to the drawings, example embodiments of the present invention will be described in detail. In the following example embodiments, an identical reference sign will be assigned to constituents serving similar functions, and their descriptions will be appropriately omitted.

First Example Embodiment

Figure 1:
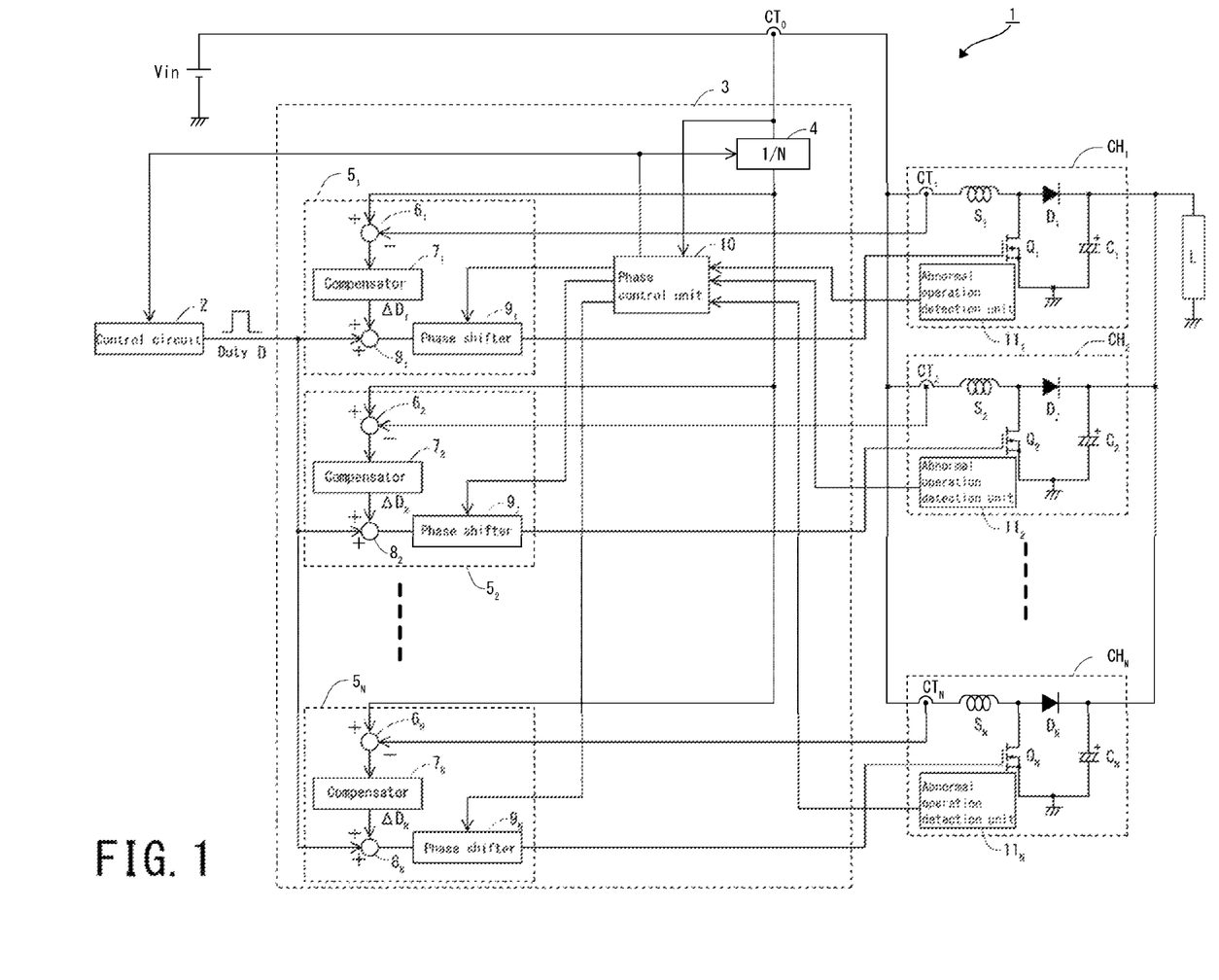
FIG. 1 is a block diagram showing a circuit configuration of a first example embodiment of a switching power supply device according to the present invention.

A switching power supply device 1 of a first example embodiment is a multi-phase DC/DC converter. Referring to FIG. 1, the switching power supply device 1 includes a control circuit 2, a pulse corrector 3, an entire current detection circuit $CT_0$, and N-number of converter units $CH_1$ to $CH_N$ collectively corresponding to a main circuit.

In the switching power supply device 1, a power supply $V_{in}$ and a load L are connected on the input and output sides, respectively. Between the power supply $V_{in}$ and the load L, the N-number of converter units $CH_1$ to $CH_N$ are provided in parallel connection with each other and are driven as operation phases for first to N-th phases, respectively.

The N-number of converter units $CH_1$ to $CH_N$ are power conversion units each including a switching element that is on/off controlled by a pulse signal. The N-number of converter units $CH_1$ to $CH_N$ have the same configuration. Accordingly, assuming n to represent natural numbers from 1 to N, detail description will be given of a converter unit $CH_n$. The converter unit $CH_n$ includes a reactor $S_n$, a diode $D_n$, a switching element $Q_n$, a capacitor $C_n$ and an individual current detection circuit $CT_n$, thereby constituting a non-isolated step-up chopper circuit. While a non-isolated step-up chopper circuit is thus taken as an example of the converter unit $CH_n$ in the present example embodiment, the converter unit $CH_n$ may be a PWM control converter other than a step-up chopper circuit (a step-down chopper circuit, a step-up/step-down chopper circuit and the like), and may also be an isolated DC/DC converter.

A series circuit is formed by the reactor $S_n$ and the diode $D_n$, and one end of the reactor $S_n$ and the cathode of the diode $D_n$, in the series circuit, are coupled to the power supply $V_{in}$ and the load L, respectively. The capacitor $C_n$ is coupled between the load L and a connection point between the cathode of the diode $D_n$ and a ground terminal, and in parallel with the load L on the output side.

In the present example embodiment, the switching element $Q_n$ is constituted by a MOSFET. Of the switching element $Q_n$, the drain is coupled to a connection point between the reactor $S_n$ and the diode $D_n$, and the source is coupled to the ground terminal. Accordingly, switching operation of the switching element $Q_n$ is controlled by a drive signal applied to the gate, and a voltage of the power supply $V_{in}$ is thereby boosted and supplied to the load L.

The converter unit $CH_n$ further includes an abnormal operation detector $11_n$. On detecting an operational abnormality in the converter unit $CH_n$, such as overheat, short circuit and failure, the abnormal operation detector $11_n$ outputs an operational abnormality signal to the pulse corrector 3.

The individual current detection circuit $CT_n$ detects a current flowing through the reactor $S_n$, that is, an output current of the converter unit $CH_n$ (for example, an average value over one cycle of the gate pulse signal, $T_s$). The individual current detection circuit $CT_n$ is constituted by, for example, a current transformer or a sense resistor.

The entire current detection circuit $CT_0$ detects an input current (for example, an average value over one cycle of the gate pulse signal, $T_s$) that is input to the entire main circuit (converter units $CH_1$ to $CH_N$) from the power supply $V_{in}$. An input current detected by the entire current detection circuit $CT_0$ represents a current input to the entire main circuit (converter units $CH_1$ to $CH_N$) that is equivalent to a sum of input currents respectively flowing through the converter units $CH_1$ to $CH_N$. The entire current detection circuit $CT_0$ is constituted by, for example, a current transformer or a sense resistor.

The control circuit 2 is a circuit configured to generate a gate pulse signal for on/off controlling the switching element $Q_n$ of the converter unit $CH_n$. The control circuit 2 outputs, to the pulse corrector 3, the gate pulse signal with its duty ratio (pulse width) being controlled to make an output voltage of the entire main circuit (converter units $CH_1$ to $CH_N$) be a target value.

Subsequently, based on the gate pulse signal input from the control circuit 2, the pulse corrector 3 generates drive signals by correcting the gate pulse signal in a manner to equalize input currents to the converter units $CH_1$ to $CH_N$ and adjusting phases of the drive signals for multi*phase operation, thereby on/off controlling the switching elements $Q_1$ to $Q_N$. Accordingly, since the pulse corrector 3 thus implements multi*phase operation and current balance, what the control circuit 2 needs to have is only a function of controlling a single-phase converter, and the control circuit 2 does not need to support the multi-phase operation.

The pulse corrector 3 is constituted by a field programmable gate array (FPGA), which functions as a divider 4, drive signal generation units $5_1$ to $5_N$, and a phase control unit 10.

The divider 4 divides an input current detected by the entire current detection circuit $CT_0$ by N' representing the number of operation phases (N' is a natural number equal to or smaller than N), thereby calculating an average current, and outputs the calculated average current to each of the drive signal generation units $5_1$ to $5_N$.

The drive signal generation units $5_1$ to $5_N$ have the same configuration. Therefore, assuming n to represent natural numbers from 1 to N, detail description will be given of a drive signal generation unit $5_n$ below. The drive signal generation unit $5_n$ includes a current deviation calculator $6_n$, a compensator $7_n$, a duty adder $8_n$ and a phase shifter $9_n$.

The current deviation calculator $6_n$ is a subtractor that calculates a difference between the average current input from the divider 4 and an output current of the converter unit $CH_n$ detected by the individual current detection circuit $CT_n$, as a current deviation.

The compensator $7_n$ determines a compensatory duty value $\Delta D_n$ for compensating for the current deviation calculated by the current deviation calculator $6_n$. Here, for the compensator $7_n$, a proportional controller (P controller), a proportional-integral controller (PI controller), a proportional-integral-differential controller (PID controller) or the like may be used.

The duty adder $8_n$ generates a drive signal having a gate pulse width of $D+\Delta D_n$ that is obtained by adding the compensatory duty value $\Delta D_n$ determined by the compensator $7_n$ to a duty value (pulse width) D of the gate pulse signal input from the control circuit 2. Accordingly, the generated drive signal becomes the one whose duty value has been corrected from that of the gate pulse signal in a direction to make an output current of the converter unit $CH_n$ become closer to the average current input from the divider 4.

Assuming a period of the gate pulse signal output from the control circuit 2 to be $T_s$, the phase shifter $9_n$ delays the drive signal generated by the duty adder $8_n$ according to a phase angle command from the phase control unit 10, and make the delayed drive signal be output to the converter unit $CH_n$.

On the basis of an operational abnormality signal input from the converter units $CH_1$ to $CH_N$, the phase control unit 10 determines any converter unit $CH_n$ corresponding to the detected operational abnormality to be an abnormal phase, and recognizes any converter unit $CH_n$ in normal operation as a normal phase. Then, the phase control unit 10 determines the number of operation phases N' on the basis of a current flowing through the entire main circuit (converter units $CH_1$ to $CH_N$) (an input current detected by the entire current detection circuit $CT_0$), and determines N'-number of operation phases to operate, from among the normal phases excluding the abnormal phases.

The phase control unit 10 reduces the number of operation phases N' when the input current detected by the entire current detection circuit $CT_0$ is small, that is, when the load L is light, while it increases the number of operation phases N' when the input current detected by the entire current detection circuit $CT_0$ is large, that is, when the load L is heavy. Thereby, the number of operation phases driven in a light load state can be reduced, and switching loss of the switching elements $Q_n$ accordingly can be reduced. As a result, it becomes possible to increase the power conversion efficiency in a light load state.

Further, the phase control unit 10 determines the number of operation phases N' such that an output current of each of the operation phases be equal to or larger than a specified value. Thereby, the output currents can be limited so as to prevent significant decrease in the efficiency.

The phase control unit 10 causes the phase shifters $9_n$ of the phases not having been included in the N'-number of operation phases to suspend outputting a drive signal, and it outputs commands for phase angles sequentially varied at an interval of 360°/N' to the phase shifters $9_n$ of the phases having been included in the N'-number of operation phases. This makes drive signals of the operation phases be output at phase angles sequentially varied at an interval of 360°/N', respectively.

Further, the phase control unit 10 outputs the number of operation phases N' to the control circuit 2. Based on the number of operation phases N', the control circuit 2 determines a control gain of the entire main circuit (converter units $CH_1$ to $CH_N$). Specifically, since a transfer function varies depending on the number of operation phases to drive, the control circuit 2 decreases the control gain with decreasing the number of operation phases N', according to the number of operation phases N'. It thereby becomes possible to control the switching power supply device 1 with an optimum control gain regardless of the number of operation phases to drive.

Figure 2:
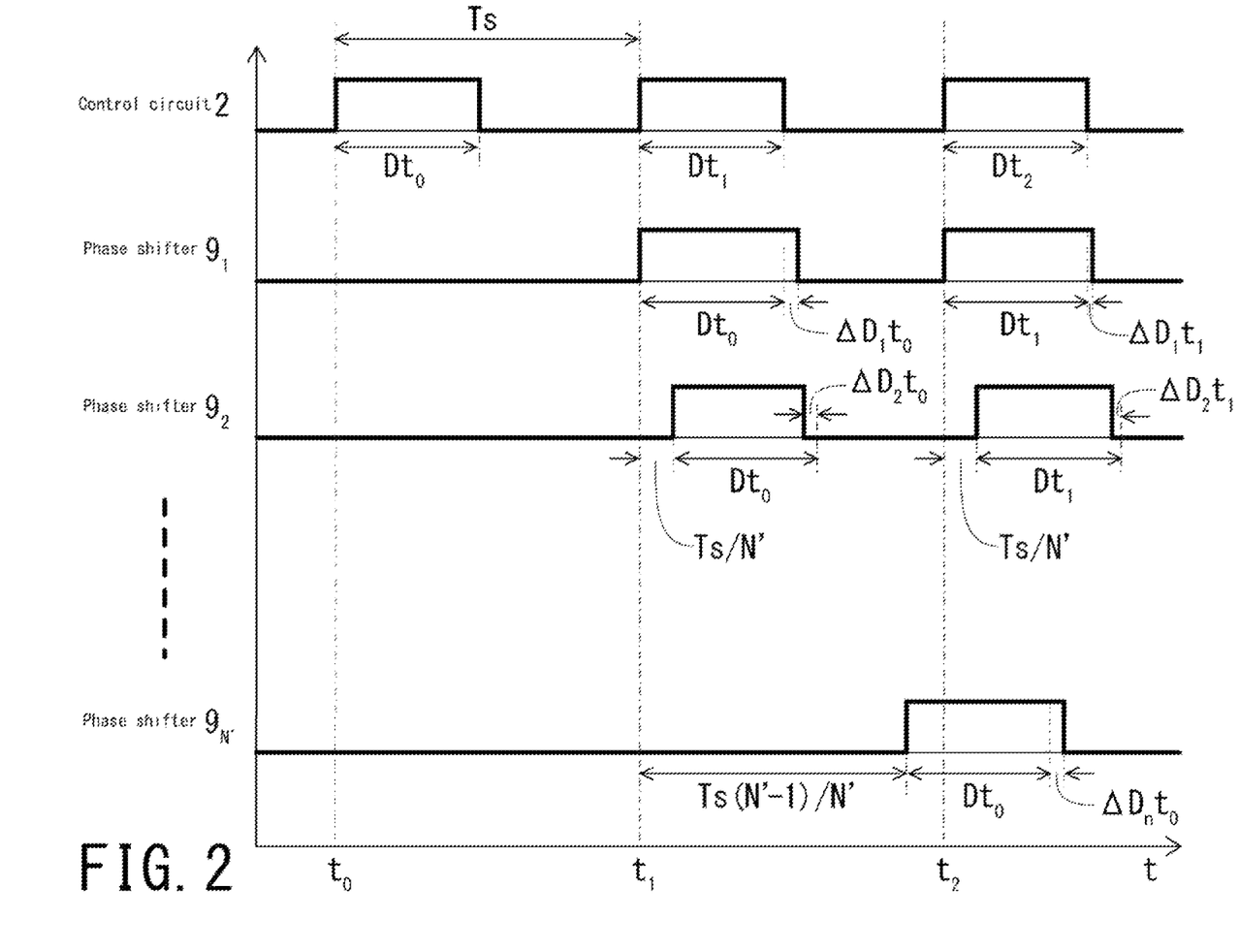
FIG. 2 is a waveform diagram showing an example of operation waveform in a pulse corrector shown in FIG. 1.

Next, with reference to FIG. 2, a method of current correction and multi-phase generation performed in the pulse corrector 3 will be described in detail. In an example shown in FIG. 2, it is assumed that a first to N'-th phases have been determined as N'-number of operation phases by the phase control unit 10.

In the pulse corrector 3, the duty adder $8_n$ of the drive signal generation unit $5_n$ measures a time (pulse width) from the rising edge to the falling edge of a gate pulse signal that is input from the control circuit 2 at a time $t_0$, as a duty value $Dt_0$. Here, a period $T_s$ of the gate pulse signal output from the control circuit 2 is to be a switching period of the converter unit $CH_n$.

In parallel with the measurement of the duty value $Dt_0$, calculation of a current deviation by the current deviation calculator $6_n$ and determination of a compensatory duty value $\Delta D_n t_0$ by the duty adder $8_n$ are performed.

Then, the duty adder $8_n$ generates a drive signal having a gate pulse width $Dt_0+\Delta D_n t_0$ obtained by adding the compensatory duty value $\Delta D_n t_0$ determined by the compensator $7_n$ to the measured duty value $Dt_0$. Accordingly, gate pulse widths of drive signals for respective ones of the operation phases corresponding to the first to N'-th phases, which are $Dt_0+\Delta D_1 t_0$, $Dt_0+\Delta D_2 t_0$, . . . , $Dt_0+\Delta D_N t_0$, respectively, are determined.

Next, the phase shifter $9_n$ makes the drive signal generated by the duty adder $8_n$ be output to the converter unit $CH_n$, at a time delayed by $T_s \times (n-1)/N'$ from a time $t_1$ at which the next gate pulse signal from the control circuit 2 rises. Accordingly, to the converter unit $CH_1$, a pulse having the gate pulse width $Dt_0+\Delta D_1 t_0$ that is to rise at the time $t_1$ is output as a gate signal for the first phase. Then, to the converter unit $CH_2$, a pulse having the gate pulse width $Dt_0+\Delta D_2 t_0$ that is to rise delaying from the drive signal for the first phase by a time $T_s/N'$ corresponding to a phase of 360°/N' is output as a drive signal for the second phase. Similarly, to the converter units $CH_2$ to $CH_{N'}$, drive signals for the third to N'-th phases generated by the duty adder $8_n$ with their phases being varied sequentially at the interval $T_s/N'$ are output, respectively.

Then, similar current correction and multi-phase generation are performed also on a gate pulse signal input at or after the time $t_1$ to the pulse corrector 3 from the control circuit 2, and thus generated signals are output in a subsequent switching cycle at or after a time $t_2$.

As has been described above, in the first example embodiment, a gate pulse signal output from the control circuit 2 is input to the pulse corrector 3, calculation for current correction and phase shift operation are performed in the pulse corrector 3, and thereby drive signals for respective ones of the N'-number of converter units $CH_1$ to $CH_{N'}$ are output. As a result, even using a microcomputer or a dedicated analog control IC for a single-phase switching power supply device, it easily becomes possible, by simply adding the pulse corrector 3, to realize multi-phase operation and current balancing with the number of operation phases depending on the amount of load.

Figure 3:
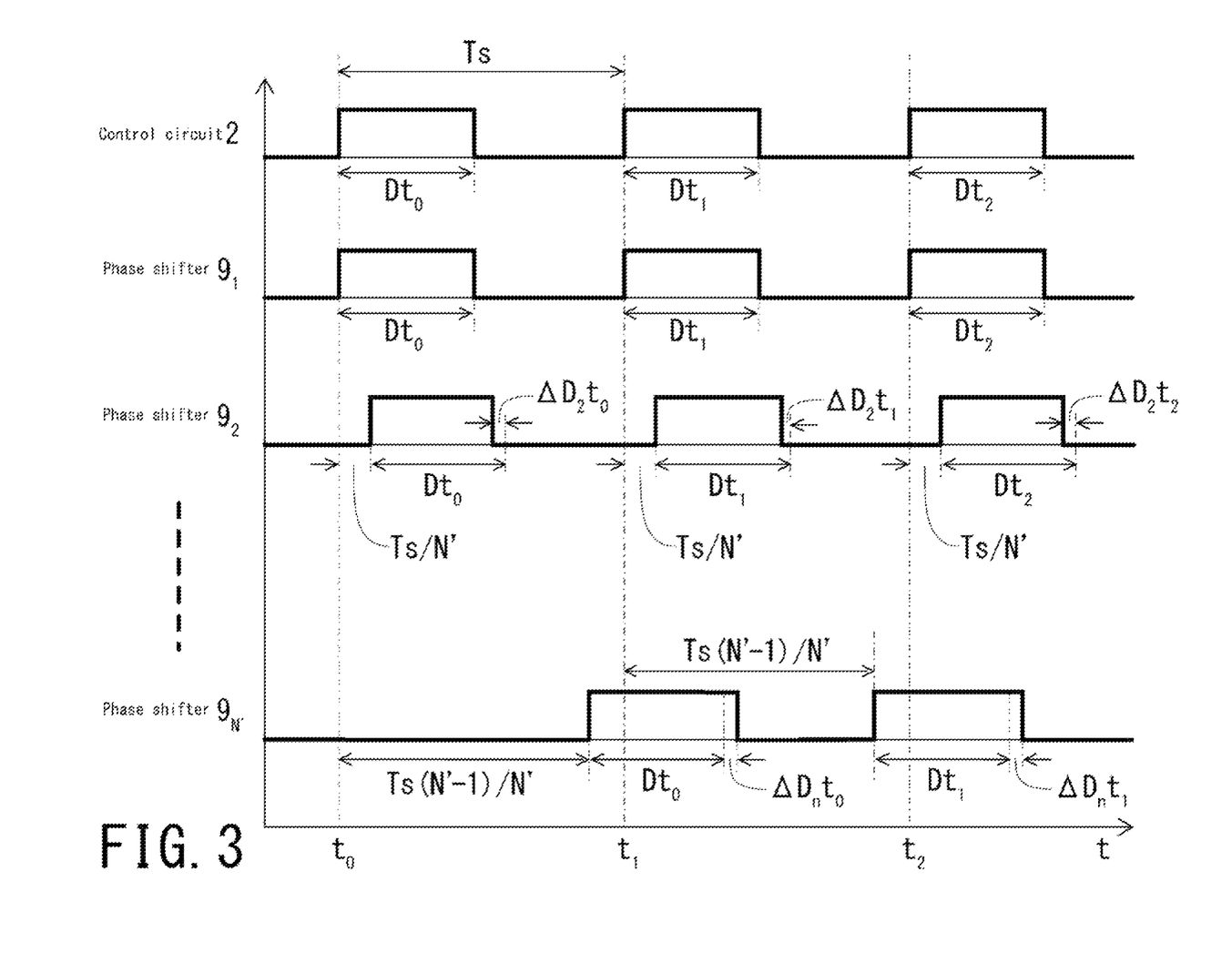
FIG. 3 is a waveform diagram showing another example of operation waveform in the pulse corrector shown in FIG. 1.

While the first example embodiment has been described to be configured to execute the multi-phase operation and current balancing with a control delay corresponding to one switching cycle, it may be configured to execute the multi-phase operation and current balancing without causing the control delay. In the latter case, as shown in FIG. 3, in the pulse corrector 3, the drive signal generation unit $5_1$ for the first phase does not perform calculation of the compensatory duty value $\Delta D_1$, and accordingly outputs a gate pulse signal output from the control circuit 2 with no change, as a drive signal for the converter unit $CH_1$. Then, in the driving signal generation units $5_2$ to $5_{N'}$ for the second to N'-th phases, calculation of the respective compensatory duty values $\Delta D_2$ to $\Delta D_{N'}$ is performed, thereby executing the current balancing.

Referring to FIG. 3, when a gate pulse signal is input from the control circuit 2 at a time $t_0$, the phase shifter $9_1$ of the drive signal generation unit $5_1$ causes a drive signal for the first phase, which is to be output to the converter unit $CH_1$, to rise at the time $t_0$, and in parallel with that, compensatory duty values $\Delta D_n t_0$ are calculated in the drive signal generation units $5_2$ to $5_{N'}$.

Subsequently, the phase shifter $9_2$ of the drive signal generation unit $5_2$ causes a drive signal for the second phase to rise after elapse of a time interval $T_s/N'$ since the rising of the drive signal for the first phase. Then, also the phase shifters $9_3$ to $9_{N'}$ of the drive signal generation units $5_3$ to $5_{N'}$ successively cause drive signals for the second to N'-th phases, respectively, to rise at the same intervals.

Next, the phase shifter $9_1$ of the drive signal generation unit $5_1$ causes the drive signal of the first phase to fall simultaneously with falling of the gate pulse signal at a time $t_0+DT_0$. In the drive signal generation units $5_2$ to $5_{N'}$, immediately on determination of the duty value $DT_0$ of the gate pulse signal output from the control circuit 2, the duty value $Dt_0$ is added to each of the compensatory duty values $\Delta D_n t_0$ calculated in advance, thereby determining gate pulse widths $DT_0+\Delta D_n t_0$ of drive signals for the respective first to N'-th phases, and the drive signals of the second to N'-th phases are caused to fall according to thus determined gate pulse widths $DT_0+\Delta D_n t_0$, respectively.

Then, similar current correction and multi-phase generation are performed also on a gate pulse signal input at or after the time $t_1$ to the pulse corrector 3 from the control circuit 2, and thus generated drive signals are output within the same switching cycle (as the gate pulse signal).

As a result, it becomes possible to realize multi-phase operation and current balancing without causing control delay. In the present case, while current correction for current balancing comes not to be performed on the first operation phase, it is performed in operation of the remaining operation phases, and accordingly, also the first operation phase automatically comes to contribute to the current balancing.

Second Example Embodiment

Figure 4:
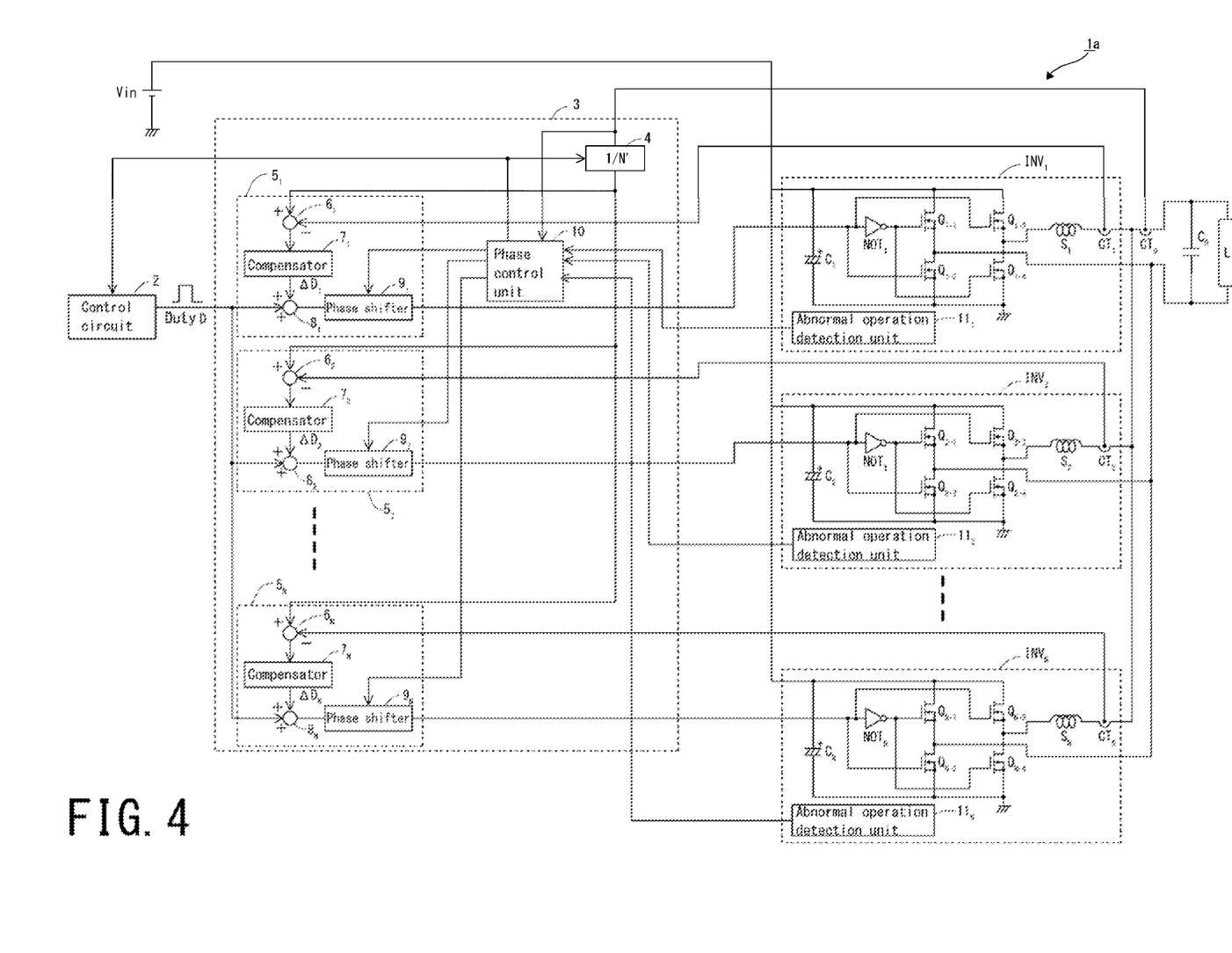
FIG. 4 is a block diagram showing a circuit configuration of a second example embodiment of a switching power supply device according to the present invention.

A switching power supply device $1a$ according to a second example embodiment is a multi-phase inverter. Referring to FIG. 4, the switching power supply device $1a$ includes a control circuit 2, a pulse corrector 3, an entire current detection circuit $CT_0$, and N-number of inverter units $INV_1$ to $INV_N$ collectively corresponding to a main circuit. Hereafter, description of similar configurations to that of the first example embodiment will be appropriately omitted.

In the switching power supply device $1a$, a power supply $V_{in}$ and a load L are connected on the input and output sides, respectively. Between the power supply $V_{in}$ and the load L, the N-number of inverter units $INV_1$ to $INV_N$ are provided in parallel connection with each other and are driven as operation phases for first to N-th phases, respectively.

The N-number of inverter units $INV_1$ to $INV_N$ are power conversion units each including a switching element that is on/off controlled by a pulse signal. The N-number of inverter units $INV_1$ to $INV_N$ have the same configuration. Accordingly, assuming n to represent natural numbers from 1 to N, detail description will be given of an inverter unit $INV_n$. The inverter unit $INV_n$ includes a capacitor $C_n$, an inversion buffer $NOT_n$, a reactor $S_n$, four switching elements $Q_{n-1}$ to $Q_{n-4}$, and an individual current detection circuit $CT_n$, thereby constituting a full-bridge single-phase inverter.

The capacitor $C_n$ is connected in parallel with the power supply $V_{in}$.

In the present example embodiment, the four switching elements $Q_{n-1}$ to $Q_{n-4}$ are each constituted by a MOS-FET. Between the positive and negative terminals of the capacitor $C_n$, a series circuit composed of the switching elements $Q_{n-1}$ and $Q_{n-2}$ is connected, and also is a series circuit composed of the switching elements $Q_{n-3}$ and $Q_{n-4}$.

A connection point between the switching elements $Q_{n-1}$ and $Q_{n-2}$ is coupled to one end of the load L via the reactor $S_n$, and a connection point between the switching elements $Q_{n-3}$ and $Q_{n-4}$ is coupled to the other end of the load L. Between the both ends of the load L, a capacitor $C_0$ functioning as a filter circuit for removing high frequency components in combination with the reactor $S_n$ of the inverter unit $INV_n$ is connected.

A drive signal from the pulse corrector 3 is input to the gates of the switching elements $Q_{n-1}$ and $Q_{n-4}$ directly, and to the gates of the switching elements $Q_{n-2}$ and $Q_{n-3}$ via the inversion buffer $NOT_n$. Thereby, on/off of the switching elements $Q_{n-1}$ to $Q_{n-4}$ is switched by the drive signal, and conversion of a DC voltage into a desired AC voltage is thereby performed.

In the second example embodiment, the individual current detection circuit $CT_n$ detects a current flowing through the reactor $S_n$, that is, an output current of the inverter unit $INV_n$. The individual current detection circuit $CT_n$ is constituted by, for example, a current transformer or a sense resistor. In the second example embodiment, the current deviation calculator $6_n$ of the pulse corrector 3 calculates, as a current deviation, a difference between an average current input from the divider 4 and the output current of the inverter unit $INV_n$ detected by the individual current detection circuit $CT_n$ (for example, an average value over one cycle of the gate pulse signal, $T_s$).

In the second example embodiment, the entire current detection circuit $CT_0$ detects an output current that is output from the entire main circuit (inverter units $INV_1$ to $INV_N$). The output current detected by the entire current detection circuit $CT_0$ represents an entire output current of the main circuit (inverter units $INV_1$ to $INV_N$) that is equivalent to a sum of output currents flowing through the respective inverter units $INV_1$ to $INV_N$. The entire current detection circuit $CT_0$ is constituted by, for example, a current transformer or a sense resistor. In the second example embodiment, the divider 4 of the pulse corrector 3 calculates an average current by dividing the output current detected by the total current detection circuit $CT_0$ (for example, an average value over one cycle of the gate pulse signal, $T_s$) by the number of operation phases N, and outputs thus calculated average current to each of the drive signal generation units $5_1$ to $5_n$.

Thus, in the second example embodiment, the gate pulse signal output from the control circuit 2 is input to the pulse corrector 3, calculation for current correction and phase shift operation are performed in the pulse corrector 3, and thereby drive signals for respective ones of the N-number of inverter units $INV_1$ to $INV_N$ are output. As a result, even using a microcomputer or a dedicated analog control IC for a single-phase switching power supply device, it easily becomes possible, by simply adding the pulse corrector 3, to realize multi-phase operation and current balancing.

As has been described above, according to the present example embodiments, the switching power supply devices include: a main circuit constituted by a plurality of power conversion units (converter units $CH_n$ or inverter units $INV_n$) each having a switching device (switching device $Q_n$ or switching devices $Q_{n-1}$ to $Q_{n-4}$) and connected in parallel with each other; a control circuit 2 configured to output a reference pulse signal on the basis of an output of the entire main circuit; an entire current detection circuit $CT_0$ configured to detect an output current of the entire main circuit as an entire current; a plurality of individual current detection circuits $CT_n$ provided corresponding to the plurality of power conversion units and configured to detect output currents of respective ones of the plurality of power conversion units as individual currents; and a pulse corrector 3 configured to generate individual pulse signals for respective ones of the plurality of power conversion units, on the basis of the entire current, the individual currents and the reference pulse signal, and to output, to the plurality of power conversion units, respective ones of the individual pulse signals for the plurality of power conversion units as drive signals for the respective switching elements, wherein the pulse corrector 3 determines the number of operation phases N' for the power conversion units on the basis of the entire current and, to the same number of power conversion units as the determined number of operation phases N', outputs respective ones of the individual pulse signals. Employing this configuration, multi-phase operation and current balancing can be performed by the use of the pulse corrector 3 with the number of operation phases depending on the amount of load, on the basis of the gate pulse signal output from the control circuit 2, accordingly the control circuit 2 does not need to have a function of multi-phase operation, and the main circuit can be efficiently operated in a multi-phase manner by simply adding the pulse corrector 3.

Further, according to the present example embodiments, the individual pulse signals for respective ones of the same number of power conversion units as the number of operation phases N' are generated by correcting a duty value of the reference pulse signal such that individual currents of respective ones of the N'-number of power conversion units each be a value obtained by dividing the entire current by the number of operation phases N'. Employing this configuration, current balancing among the plurality of power converter units constituting the main circuit can be realized by simply adding the pulse corrector 3.

Further, according to the present example embodiments, the pulse corrector 3 makes the plurality of power conversion units operate in a multi-phase manner. Employing this configuration, an interleave (multi-phase) function can be provided by simply adding the pulse corrector 3.

Further, according to the present example embodiments, the pulse corrector 3 outputs the reference pulse signal with no change to an operation phase corresponding to the first phase, as a drive signal for its switching element, and outputs the generated individual pulse signals after shifting their phase angles with reference to the reference pulse signal by amounts sequentially increasing at constant intervals, to respective operation phases corresponding to phases other than the first phase. Employing this configuration, a duty value D of the gate pulse signal determined at a time of outputting the drive signal for the first phase can be reflected in the second and subsequent phases, and accordingly multi-phase operation and current balancing can be performed without causing control delay.

Further, according to the present example embodiments, the pulse corrector 3 outputs the number of operation phases N' to the control circuit 2, and the control circuit 2 changes either or both of a control gain of the entire main circuit and a threshold value of overload detection, on the basis of the number of operation phases N'. Employing this configuration, safe operation with an optimum control gain further becomes possible.

Further, according to the present example embodiments, the pulse corrector 3 determines the number of operation phases N' such that each of the output currents be equal to or larger than a specified threshold value. Employing this configuration, the output currents can be limited so as to prevent decrease in the efficiency.

Further, according to the present example embodiments, abnormal operation detection units $11_1$ to $11_N$ configured to detect an abnormal operation in respective ones of the plurality of power conversion units are provided, and the pulse corrector 3 determines any power conversion unit on which an abnormal operation has been detected to be an abnormal phase and suspend outputting an individual pulse signal for the abnormal phase, and also determines any power conversion unit on which no abnormal operation has been detected to be a normal phase and generates individual pulse signals for the normal phases by correcting a duty value of the reference pulse signal in a manner to equalize individual currents of the respective normal phases. Employing this configuration, even when some of the power converter units constituting the circuit cannot be used because of its operational abnormality, operation using the remaining normally-operating power converter units can be performed with their phase angles kept being sequentially varied at constant intervals and their current balance being maintained. Additionally, since the operation is performed by excluding an abnormal power converter, redundant operation becomes possible.

Furthermore, according to the present example embodiments, the pulse corrector 3 outputs the number of normal phases to the control circuit 2, and the control circuit 2 changes either or both of a control gain of the entire main circuit and a threshold value of overload detection, on the basis of the number of normal phases. Employing this configuration, safe operation with an optimum control gain further becomes possible.

While the present invention has been described above with reference to the specific example embodiments, it is obvious that the example embodiments are merely examples and may be implemented with any changes or modifications within a range not departing from the spirit of the present invention.

REFERENCE SIGNS LIST 1, 1a switching power supply device
$V_{in}$ power supply
$CH_1$ to $CH_N$ converter unit
$S_1$ to $S_N$ reactor
$D_1$ to $D_N$ diode
$Q_1$ to $Q_N$, ($Q_{1-1}$ to $Q_{1-4}$) to ($Q_{N-1}$ to $Q_{N-4}$) switching element
$C_0$, $C_1$ to $C_N$ capacitor
$CT_1$ entire current detection circuit
$CT_1$ to $CT_N$ individual current detection circuit
$INV_1$ to $INV_N$ inverter unit
$NOT_1$-$NOT_N$ inversion buffer
L load
2 control circuit
3 pulse corrector
4 divider
$5_1$ to $5_N$ drive signal generation unit
$6_1$ to $6_N$ current deviation calculator
$7_1$ to $7_N$ compensator
$8_1$ to $8_N$ duty adder
$9_1$ to $9_N$ phase shifter
10 phase control unit
$11_1$ to $11_N$ abnormal operation detection unit

What is claimed is:
1. A switching power supply device comprising:
a main circuit including a plurality of power conversion units each having a switching element and connected in parallel with each other;
a control circuit configured to output a reference pulse signal on a basis of an output of the entire main circuit;
an entire current detection circuit configured to detect an output current of the entire main circuit as an entire current;
a plurality of individual current detection circuits provided corresponding to the plurality of power conversion units and configured to detect output currents of respective ones of the plurality of power conversion units as individual currents; and
a pulse corrector configured to generate individual pulse signals for respective ones of the plurality of power conversion units on a basis of the entire current, the individual currents and the reference pulse signal, and to output, to the plurality of power conversion units, respective ones of the individual pulse signals for the plurality of power conversion units as drive signals for the respective switching elements, wherein the pulse corrector determines a number of operation phases for the power conversion units on the basis of the entire current and outputs respective ones of the individual pulse signals to the same number of power conversion units as the determined number of operation phase, wherein the switching power supply device comprises abnormal operation detection units configured to detect an abnormal operation in respective ones of the plurality of power conversion units, wherein the pulse corrector determines any power conversion unit on which the abnormal operation has been detected to be an abnormal phase and suspends outputting the individual pulse signal for the abnormal phase, and also determines any power conversion unit on which no abnormal operation has been detected to be a normal phase and generates the individual pulse signals for the normal phases by correcting a duty value of the reference pulse signal in a manner to equalize the individual currents of the respective normal phases, wherein the pulse corrector outputs a number of normal phases to the control circuit, and wherein, on a basis of the number of the normal phases, the control circuit changes both of a control gain of the entire main circuit and a threshold value of overload detection.

2. The switching power supply device according to claim 1, wherein the pulse corrector generates the individual pulse signals for respective ones of the same number of power conversion units as the number of operation phases by correcting a duty value of the reference pulse signal such that the individual currents of respective ones of the same number of power conversion units as the number of operation phases be equal to a value obtained by dividing the entire current by the number of operation phases.

3. The switching power supply device according to claim 1, wherein the pulse corrector causes the plurality of power conversion units to operate in a multi-phase manner.

4. The switching power supply device according to claim 1, wherein the pulse corrector outputs the number of operation phases to the control circuit, and wherein, on a basis of the number of operation phases, the control circuit changes a control gain of the entire main circuit.

5. The switching power supply device according to claim 1, wherein the pulse corrector determines the number of operation phases such that each output current be equal to or larger than a specified threshold value.

* * * * *